US012588062B2

(12) United States Patent
Barton et al.

(10) Patent No.: US 12,588,062 B2
(45) Date of Patent: Mar. 24, 2026

(54) FREQUENCY ASSIGNMENT MECHANISMS FOR BACKSCATTER DEVICES

(71) Applicant: Cisco Technology, Inc., San Jose, CA (US)

(72) Inventors: Robert E. Barton, Richmond (CA); Jerome Henry, Pittsboro, NC (US); Indermeet S. Gandhi, San Jose, CA (US); Domenico Ficara, Essertines-sur-Yverdon (CH); Amine Choukir, Ecublens (CH)

(73) Assignee: Cisco Technology, Inc., San Jose, CA (US)

( * ) Notice: Subject to any disclaimer, the term of this patent is extended or adjusted under 35 U.S.C. 154(b) by 415 days.

(21) Appl. No.: 18/295,223

(22) Filed: Apr. 3, 2023

(65) Prior Publication Data

US 2024/0334483 A1     Oct. 3, 2024

(51) Int. Cl.
*H04W 74/0816* (2024.01)
*H04B 1/713* (2011.01)
*H04W 72/0453* (2023.01)

(52) U.S. Cl.
CPC ........ *H04W 74/0816* (2013.01); *H04B 1/713* (2013.01); *H04W 72/0453* (2013.01)

(58) Field of Classification Search
CPC .......... H04W 74/0816; H04W 72/0453; H04B 1/713
See application file for complete search history.

(56) References Cited

U.S. PATENT DOCUMENTS

| | | |
|---|---|---|
| 2017/0311325 A1 | 10/2017 | Cariou et al. |
| 2018/0269909 A1 | 9/2018 | Reynolds |
| 2020/0052734 A1* | 2/2020 | Talla .................... H04B 1/1081 |
| 2020/0212956 A1 | 7/2020 | Gollakota et al. |
| 2020/0412591 A1 | 12/2020 | Lopez et al. |
| 2021/0368439 A1 | 11/2021 | Karimaruthumkal et al. |
| 2022/0174676 A1* | 6/2022 | Huang ............... G06K 7/10069 |
| 2023/0353181 A1* | 11/2023 | Besnoff .................. H04B 1/385 |
| 2024/0106532 A1* | 3/2024 | Mahalingam ..... H04W 52/0229 |
| 2024/0179494 A1* | 5/2024 | Säily .................... H04W 4/029 |

(Continued)

OTHER PUBLICATIONS

Daniel M. Dobkin, "RFID Basics: Backscatter Radio Links and Link Budgets," EE|Times: DesginLines | RF & Microwave DesignLine, Dated: Oct. 2, 2007, pp. 1-8.

(Continued)

*Primary Examiner* — Yu-Wen Chang
(74) *Attorney, Agent, or Firm* — Patterson + Sheridan, LLP

(57) ABSTRACT

Embodiments herein describe BKDs that can transmit reply messages using different frequencies than the frequencies of wireless transmissions they receive which can reduce collisions in a Wi-Fi environment. In one embodiment, when transmitting power to be used by a BKD to transmit a reply message, an access point (AP) also includes an parameter that affects the frequency used by the BKD when transmitting its signal. For example, the AP can direct the BKD to use a frequency in a channel that is not used by other Wi-Fi Devices. The BKD can be equipped with a frequency filter that can shift the carrier frequency of the BKD response (compared to the carrier frequency of the energy-bearing signal) allowing the response signal to be transmitted on a different frequency than the one which was received.

20 Claims, 6 Drawing Sheets

*200*

*205*

TRANSMIT A WIRELESS MESSAGE TO A BKD USING A FIRST FREQUENCY THAT INCLUDES A PARAMETER FOR CONTROLLING THE FREQUENCY OF A REPLY MESSAGE

*210*

RECEIVE A REPLY MESSAGE FROM THE BKD AT A SECOND FREQUENCY BASED ON THE PARAMETER

(56)         References Cited

U.S. PATENT DOCUMENTS

2024/0183971 A1 *   6/2024   Wang ................... G01S 5/0236
2024/0187986 A1 *   6/2024   Dunna ............... H04L 27/0006
2025/0086411 A1 *   3/2025   Wu .................... G06K 7/10297
2025/0126007 A1 *   4/2025   He .................... H04L 27/26025

OTHER PUBLICATIONS

Zhang, Pengyu, et al. "Hitchhike: Practical backscatter using commodity wifi." Proceedings of the 14th ACM Conference on Embedded Network Sensor Systems CD-ROM. Year: 2016. pp. 259-271.

* cited by examiner

*500*

*505*

SELECT A FREQUENCY FOR A BKD

*510*

INFORM WI FI DEVICES OF THE FREQUENCY FOR THE BKD

*515*

INFORM NEIGHBORING APs OF THE FREQUENCY FOR THE BKD

FREQUENCY ASSIGNMENT MECHANISMS FOR BACKSCATTER DEVICES

TECHNICAL FIELD

Embodiments presented in this disclosure generally relate to receiving a reply message from a backscatter device (BKD) at a different frequency than a frequency used to communicate with the BKD.

BACKGROUND

The AMP (AMbient Power) group is considering the integration of BKDs into Wi-Fi networks. Generally, a system transmits energy that BKDs receive and use for their own transmissions. In one form, the BKD is entirely passive, and merely reflects (thus in real time) the energy. In another form, the BKD can accumulate the energy in an energy storage component, such as a capacitor, until reaching a threshold at which transmission becomes possible (thus transmission is not concurrent to the received Wi-Fi signal, but can still happen at any time after enough energy has accumulated).

In either mode, the BKD transmission can interfere with neighboring Wi-Fi devices transmissions. This is even more challenging because the BKD may transmit at any time the energy storage device has enough energy to transmit, and the device will neither contend for the medium (e.g., perform clear channel assessment (CCA)), nor wait for instructions from an AP to transmit. Current solutions ignore this problem, as they focuses on the BKD as the primary subject. As such, current solutions do not provide guidance for permitting BKDs to function in a Wi-Fi environment with minimal contention.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
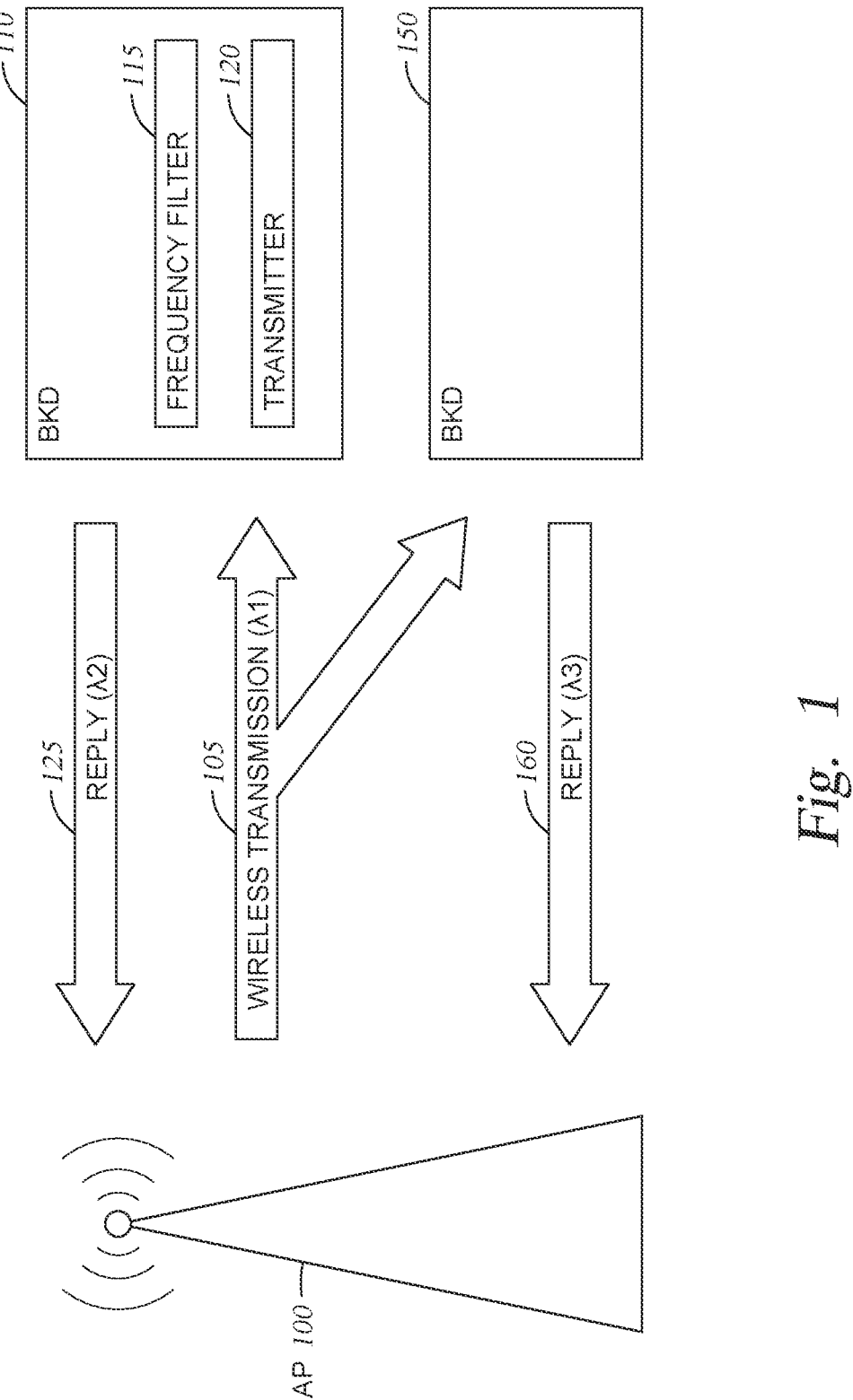
FIG. 1 is a communication system where a BKD transmits on a different frequency than it receives, according to one embodiment.

One embodiment presented in this disclosure is a method that includes transmitting, from an access point (AP), a frame to a BKD using a first frequency where the frame provides power to the BKD and comprises a parameter that causes the BKD to transmit a reply message using a second frequency different from the first frequency and where the parameter includes a frequency offset that adjusts a frequency filter in the BKD. The method also includes receiving, at the AP, a reply message from the BKD using the second frequency and the power provided by the AP.

Another embodiment presented in this disclosure is an AP that includes a processor and memory configured to store an application which, when executed by the processor, performs an operation. The operation includes transmitting a frame to a BKD using a first frequency where the frame provides power to the BKD and includes a parameter that causes the BKD to transmit a reply message using a second frequency different from the first frequency and where the parameter includes a frequency offset that adjusts a frequency filter in the BKD. The operation also includes receiving a reply message from the BKD using the second frequency and the power provided by the AP.

Another embodiment presented in this disclosure is an non-transitory computer readable medium containing computer program code that, when executed by operation of one or more processors, performs an operation. The operation includes transmitting, from an AP, a frame to a BKD using a first frequency where the frame provides power to the BKD and comprises a parameter that causes the BKD to transmit a reply message using a second frequency different from the first frequency and where the parameter includes a frequency offset that adjusts a frequency filter in the BKD. The operation also includes receiving, at the AP, a reply message from the BKD using the second frequency and the power provided by the AP.

Example Embodiments

Embodiments herein describe BKDs that can transmit reply messages using different frequencies than the frequencies of wireless transmissions they receive, which can reduce collisions in a Wi-Fi environment. In one embodiment, when transmitting power to be used by a BKD to transmit a reply message, an access point (AP) also includes a parameter that affects the frequency used by the BKD when transmitting its signal. For example, the AP can direct the BKD to use a frequency in a channel that is not used by other Wi-Fi Devices. Currently, BKDs transmit on the carrier frequency at which the energy-bearing signal was received. However, in the embodiments herein, the BKD can be equipped with a frequency filter (or some other frequency adjustment mechanism) that can shift the carrier frequency of the BKD response (compared to the carrier frequency of the energy-bearing signal) allowing the reply signal to be transmitted on a different frequency than the carrier frequency of the energy-bearing signal. In this manner, the AP can control the frequency the BKDs use for their reply messages.

In some embodiments, instead of using a frequency filter, the BKDs can use a predefined offset. In one embodiment, the AP can indicate a prescribed frequency hopping sequence for the BKDs. Further, the AP can alert Wi-Fi devices of the frequencies used by the BKDs so the Wi-Fi devices can avoid these communication channels. Moreover, the AP can request neighboring APs receive the reply messages transmitted by the BKDs.

FIG. 1 is a communication system where a BKD 110 transmits on a different frequency than it receives, according to one embodiment. In one embodiment, the BKD 110 is a passive device that relies on received wireless transmissions 105 to provide it with power to transmit a reply 125. For example, the BKD 110 may not have a battery or be connected to a power source (e.g., plugged into an outlet). Instead, the power of a received wireless signal can be used to power a transmitter 120 in the BKD 110 so it can transmit wireless signals. In one embodiment, the BKD 110 is a radio frequency identification (RFID) tag, an environmental sensor, a tracking device, and the like.

The BKD 110 may be a mobile device or a stationary device. For example, the BKD 110 may be attached to an item that moves around a physical environment (e.g., a cart). In another example, the BKD 110 may be stationary (e.g., a temperature or humidity sensor mounted onto a wall or roof).

In this example, the AP 100 transmits the wireless transmission 105 to the BKD 110. This wireless transmission 105 can provide power to the transmitter 120 in the BKD 110 so it can wireless transmit the reply 125. Notably, the wireless transmission 105 occurs using a first frequency (λ1) while the reply 125 is at a second frequency (λ2). In one embodiment, the wireless transmission 105 has a different carrier frequency than the reply 125. For example, the wireless transmission 105 and reply 125 may use different channels, different sub-carriers within a channel, or use different frequency bands (e.g., 2.4 GHz and 5 GHZ).

In one embodiment, the wireless transmission 105 includes a parameter for tuning a frequency filter 115 of the BKD 110. The frequency filter 115 controls the frequency of the reply 125. For example, the frequency filter 115 may set the carrier frequency of the transmitter 120 when transmitting the reply 125. The parameter provided by the AP 100 can set the frequency of the reply 125. In this manner, the AP 100 can set the frequency offset between the wireless transmission 105 and the reply 125. For example, the AP 100 can use the parameter to direct the BKD 110 to transmit the reply 125 in a carrier that the AP 100 knows is not being used (or is seldom used) by other Wi-Fi devices.

Moreover, the AP 100 can change the parameter as the frequency usage of the medium changes. For example, during Time A, the AP 100 may transmit a parameter that adjusts the frequency filter 115 and causes the transmitter 120 to transmit the reply 125 in Channel A. However, a Wi-Fi device (e.g., a client device such as a mobile phone, laptop, desktop, tablet, etc.) may begin to use Channel A to communicate with the AP 100. In response, in the next wireless transmission 105 to the BKD 110, the AP 100 may transmit a parameter that causes the frequency filter 115 and transmitter 120 to transmit the reply 125 in Channel B to avoid contending with the Wi-Fi device.

In one embodiment, the frequency filter 115 incorporates a semiconductor filter with a lookup table and switching capability (e.g., multi-output Operational Transconductance Amplifiers (OTA)) as a variable resistor for tuning the frequency. Upon receiving a frequency offset frame from the AP 100 (e.g., the wireless transmission 105), the BKD 110 sets the filter 115 to the matching table value and associated response frequency. The offset value (e.g., the parameter) in the AP frame (e.g., the wireless transmission 105) may be represented with a specific payload, or by sending the frame with a specific structure.

FIG. 1 illustrates a second BKD 150 that can also receive the wireless transmission 105 from the AP 100. Put differently, the wireless transmission 105 can be received at both the BKD 110 and the BKD 150.

In one embodiment, the wireless transmission 105 includes second parameters to control the frequency of a reply 160 transmitted by the second BKD 150. That is, the wireless transmission 105 (e.g., a frequency offset frame) can include parameters for controlling the frequency of the reply 125 for the first BKD 110 and parameters for controlling the frequency of the reply 160 for the second BKD 150. In this example, the wireless transmission 105 instructs a filter on the BKD 150 to adjust the carrier frequency of the reply 160 so it is at a different frequency λ3 than the frequency of the wireless transmission 105 (λ1) and the frequency of the reply 125 (λ2). Thus, the AP 100 can use different parameters to set different reply frequencies for the BKDs. This can avoid the reply 125 of the BKD 110 from interfering with the reply 160 for the BKD 150 when these messages are received in parallel at the AP 100. In one embodiment, the wireless transmission 105 can include identifying data (e.g., BKD IDs) so the respective BKDs 110 and 150 can determine which parameters they should use to control the frequency of the reply messages.

The frequencies used by the replies 125 and 160 of the BKDs 110 and 150 can be different bands, different channels, or different subcarriers in the same channel.

Figure 2:
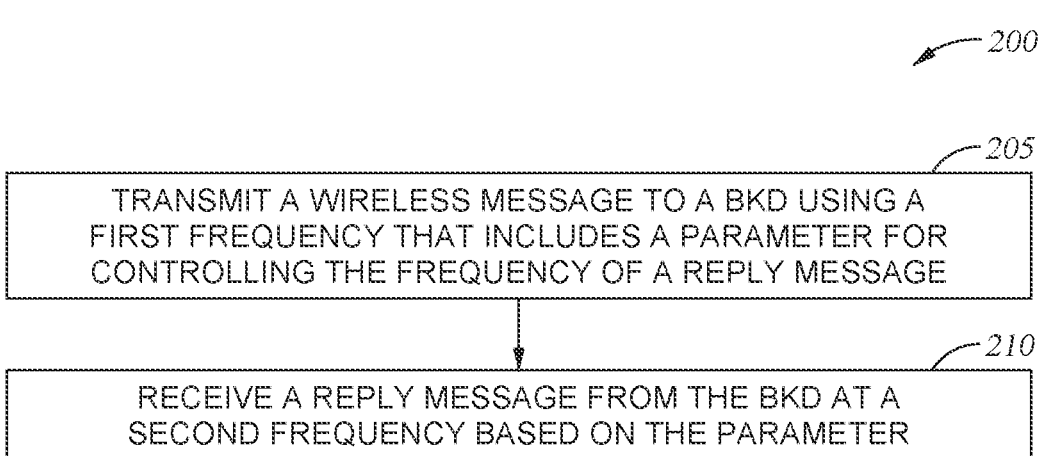
FIG. 2 is a flowchart for controlling the frequency used by a BKD when transmitting a reply message, according to one embodiment.

FIG. 2 is a flowchart of a method 200 for controlling the frequency used by a BKD when transmitting a reply message, according to one embodiment. At block 205, an AP transmits a wireless massage (e.g., a frame) to a BKD using a first frequency that includes a parameter for controlling the frequency of the reply message. In one embodiment, the parameter is a frequency offset that controls a frequency filter in the BKD. The frequency offset can be relative to the frequency of the wireless message. The parameter can change the frequency of the reply message so that it is in a different sub-carrier, channel, or frequency band as the wireless message.

In one embodiment, the BKD uses the parameter to index into a lookup table to then output control signals for the frequency filter in the BKD. In one embodiment, the wireless message is an AP frame that includes an offset value (e.g., a parameter) that controls the frequency filter in the BKD.

At block 210, the AP receives a reply message from the BKD at a second frequency based on the parameter (e.g., a frequency offset in the wireless message). In this manner, the AP can set the frequency of the reply message it receives (or other Wi-Fi devices receive) from the BKD.

In one embodiment, the AP may set the parameter in each frame or wireless message it transmits to the BKD. However, in other embodiments, the AP may send the parameter only once (or at least not every time it transmits a frame to the BKD). The BKD may continue to use the same frequency offset dictated by the parameter until the BKD receives an updated or adjusted parameter from the AP. As such, the AP can change the frequency of the reply message transmitted by the BKD in response to changes in the wireless environment (e.g., to avoid noise, traffic from other Wi-Fi devices, and the like).

In one embodiment, the power used by the BKD is provided by the wireless transmission transmitted at block 205. That is, the BKD may be a passive device that relies on the power in the received wireless signals to power its transmitter to modulate and then transmit the reply message. In one embodiment, the BKD may receive sufficient power from the wireless transmission at block 205 to immediately transmit the reply message at block 210. However, in other embodiments, the BKD may store power from a plurality of received wireless communications (e.g., using a capacitor) before having sufficient power to transmit the reply message.

Figure 3:
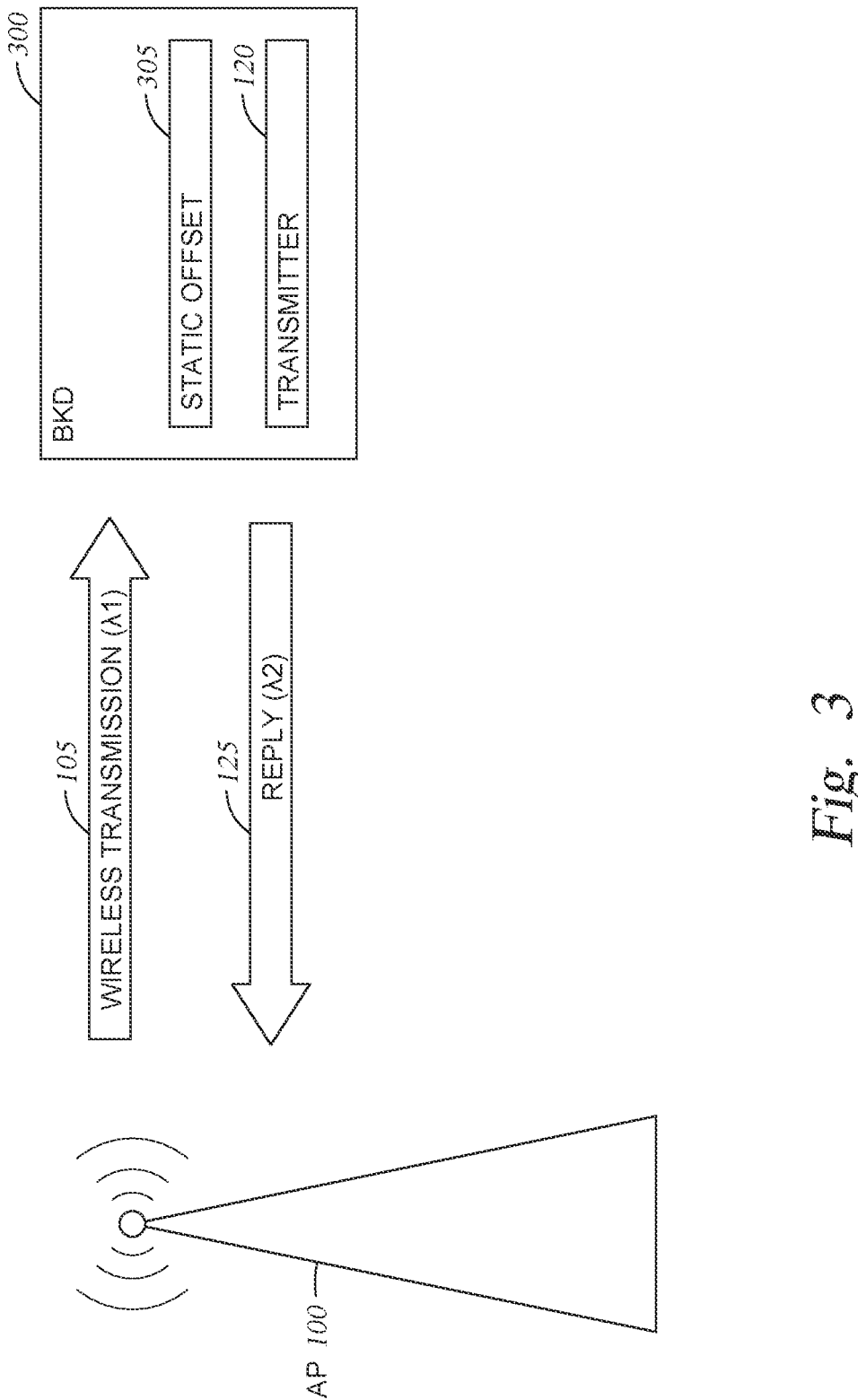
FIG. 3 is a communication system where a BKD transmits on a different frequency than it receives, according to one embodiment.

FIG. 3 is a communication system where a BKD transmits on a different frequency than it receives, according to one embodiment. In one embodiment, the BKD 300 is a passive device that relies on received wireless transmissions 105 to provide it with power to transmit a reply 125. For example, the BKD 300 may not have a battery or be connected to a power source (e.g., plugged into an outlet). Instead, the power of a received wireless signal can be used to power a transmitter 120 in the BKD 300 so it can transmit wireless signals. In one embodiment, the BKD 300 is a RFID tag, an environmental sensor, a tracking device, and the like.

Like in FIG. 1, the AP 100 transmits the wireless transmission 105 to the BKD 300. This wireless transmission 105 can provide power to the transmitter 120 in the BKD 300 so it can wireless transmit the reply 125. Notably, the wireless transmission 105 occurs using a first frequency (λ1) while the reply 125 is at a second frequency (λ2). In one embodiment, the wireless transmission 105 has a different carrier frequency than the reply 125. For example, the wireless transmission 105 and reply 125 may use different channels, different sub-carrier within a channel, or use different frequency bands (e.g., 2.4 GHz and 5 GHZ).

However, unlike in FIG. 1, the wireless transmission 105 in FIG. 3 does not includes a parameter for tuning the frequency of the reply 125. In this example, the AP 100 may not have direct control over the frequency of the reply 125. Instead, the BKD 300 has a static offset 305 which sets the frequency difference between the frequency of the wireless transmission 105 and the reply 125. For example, the BKD 300 may include a frequency filter but instead of using a parameter in the wireless transmission to change the frequency of the reply 125, the filter may use the static offset 305 to generate a reply 125 with a different frequency as the wireless transmission 105.

In one embodiment, the AP 100 can still exhibit control of the frequency of the reply 125 by setting the frequency of the wireless transmission 105. That is, because the static offset 305 is based the frequency of the wireless transmission 105, by changing the carrier frequency of the wireless transmission 105, the AP 100 can change the frequency of the reply 125. For example, the static offset 305 may add a fixed 20 MHz to the carrier frequency of the wireless transmission 105 to set the carrier frequency of the reply 125. Thus, the AP 100 can control the frequency of the reply 125 without having to provide a parameter to the BKD 300 as discussed in FIGS. 1 and 2. As such, the AP 100 in FIG. 3 can still change the parameter as the frequency usage of the medium changes.

For example, during Time A, the AP 100 may transmit a wireless transmission 105 that is in a first sub-carrier in Channel A. The static offset 305 may cause the reply 125 to be in a second sub-carrier in Channel A. However, a Wi-Fi device (e.g., a client device such as a mobile phone, laptop, desktop, tablet, etc.) may begin to use the second sub-carrier to communicate with the AP 100. In response, in the next wireless transmission 105 to the BKD 300, the AP 100 may transmit the wireless transmission 105 in a third sub-carrier in Channel A (or in a different channel) which causes the reply 125 to be in a fourth-sub-carrier in Channel A (or a different channel).

Figure 4:
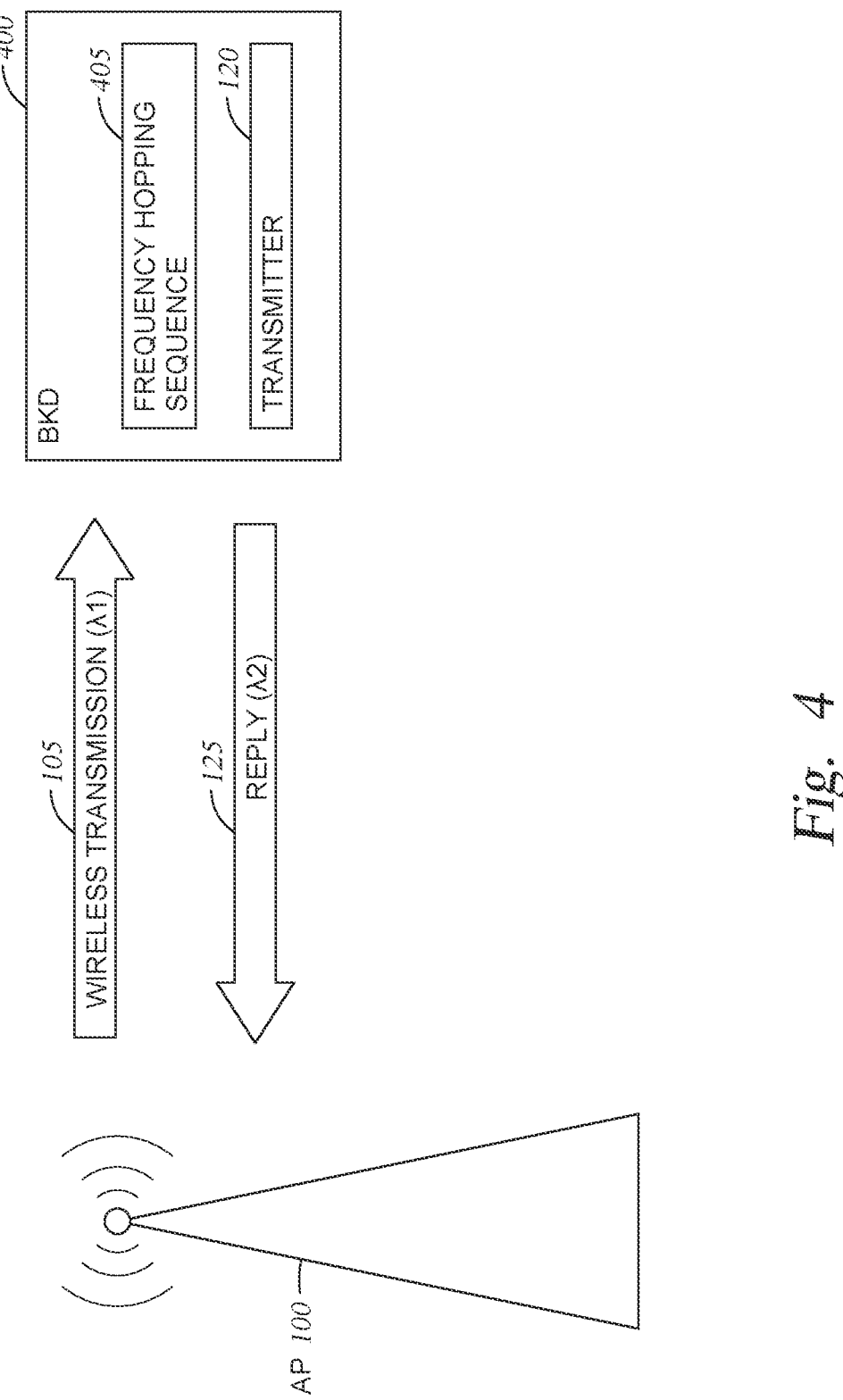
FIG. 4 is a communication system where a BKD transmits on a different frequency than it receives, according to one embodiment.

FIG. 4 is a communication system where a BKD 400 transmits on a different frequency than it receives, according to one embodiment. In one embodiment, the BKD 400 is a passive device that relies on received wireless transmissions 105 to provide it with power to transmit a reply 125. For example, the BKD 400 may not have a battery or be connected to a power source (e.g., plugged into an outlet). Instead, the power of a received wireless signal can be used to power a transmitter 120 in the BKD 400 so it can transmit wireless signals. In one embodiment, the BKD 400 is a RFID tag, an environmental sensor, a tracking device, and the like.

Like in FIG. 1, the AP 100 transmits the wireless transmission 105 to the BKD 400. This wireless transmission 105 can provide power to the transmitter 120 in the BKD 400 so it can wireless transmit the reply 125. Notably, the wireless transmission 105 occurs using a first frequency (λ1) while the reply 125 is at a second frequency (λ2). In one embodiment, the wireless transmission 105 has a different carrier frequency than the reply 125. For example, the wireless transmission 105 and reply may use different channels, different sub-carrier within a channel, or use different frequency bands (e.g., 2.4 GHz and 5 GHZ).

However, unlike in FIG. 1, the wireless transmission 105 in FIG. 4 provides a frequency hopping sequence 405 to the BKD 400, which is synchronized to the AP 100. The frequency hopping sequence 405 can indicate the sequence of frequencies the BKD 400 transmits each reply message. For example, the sequence 405 may indicate that the first reply 125 should be transmitted on Frequency A, the second reply 125 should be transmitted on Frequency B, the third reply 125 should be transmitted on Frequency C, and so forth.

The frequency hopping sequence 405 may repeat. For example, the reply messages may hop from Frequency A, then to Frequency B, then to Frequency C before the fourth reply message is again transmitted at Frequency A, the fifth reply message at Frequency B, and so forth.

In one embodiment, the wireless transmission 105 may include data detailing the frequency hopping sequence 405. That is, the AP may use a data frame to indicate each hop in the sequence 405 in the data frame. However, in other embodiments, the BKD 400 may store a plurality of predefined frequency hopping sequences (e.g., in a lookup table). The wireless transmission 105 can include a lookup value that indicates which of the stored frequency hopping sequences should be used to transmit the reply message. That way, the AP 100 only has to send the lookup value which the BKD 400 then uses to select a corresponding hopping sequence 405. In either case, the AP 100 knows the frequency hopping sequence that will be used by the BKD 400 so the AP 100 and the BKD 400 can be synchronized. Put differently, the AP 100 can track the reply messages it receives from the BKD 400, and as such, always knows the frequency of the next reply message it will receive from the BKD 400 according to the assigned frequency hopping sequence 405.

Assigning frequency hopping sequences 405 to the BKDs 400 can reduce interference caused by multiple BKDs transmitting at the same time on the same frequency. For example, the AP can assign different frequency hopping sequences 405 to different BKDs 400. That way, if the AP 100 receives reply messages from multiple BKDs 400 in parallel, the reply messages are on different frequencies, thereby reducing interference so both messages can be successfully received at the AP 100.

Figure 5:
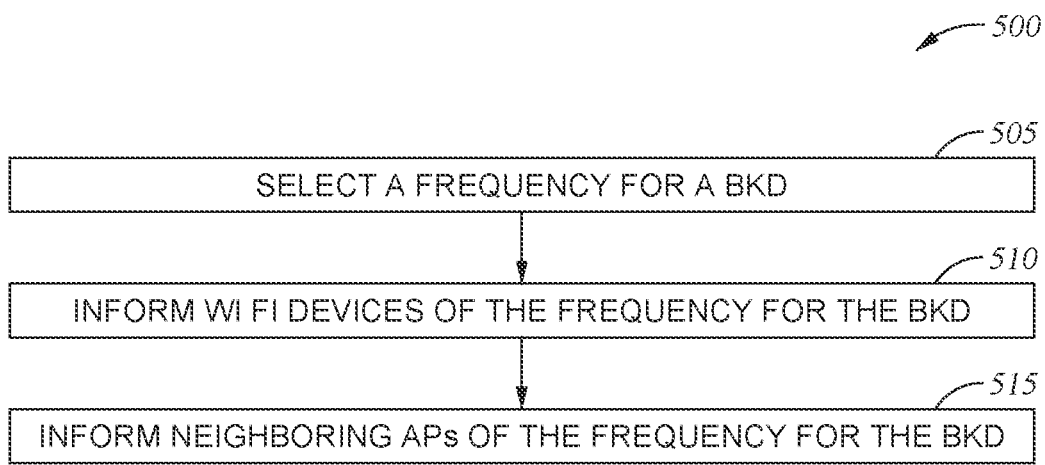
FIG. 5 is a flowchart for alerting Wi-Fi devices about BKD communications, according to one embodiment.

FIG. 5 is a flowchart of a method 500 for alerting Wi-Fi devices about BKD communications, according to one embodiment. At block 505, the AP selects a frequency for the BKD. This block may occur before block 205 in the method 200 in FIG. 2 or before the AP assigns a particular frequency hopping sequence to the BKD as discussed in FIG. 4.

In one embodiment, the AP selects a frequency that moves the carrier frequencies of the reply messages sent by the BKD away from key frequencies used for Wi-Fi transmissions. In addition, the AP can select a frequency that moves the carrier frequencies of configurable BKDs (e.g., BKDs where the AP can control the frequencies of the reply messages) from the detected frequency of non-configurable BKDs. For example, legacy, non-configurable BKDs may be unable to adjust the frequency of their reply messages, and thus, the carrier frequencies of their reply messages may match the carrier frequencies of the received wireless transmissions. Thus, the AP can select frequencies for the configurable BKDs that avoid both normal Wi-Fi transmissions as well as the frequencies of the non-configurable BKDs.

However, in another embodiment, it may be desirable to adjust the configurable BKDs so they generate reply messages with the same frequency as the reply messages of non-configurable BKDs. As an example, it may be desirable to receive the reply messages of the BKDs, whether those BKDs are configurable or non-configurable, at a same frequency. Controlling the frequencies of the configurable BKDs permit them to be grouped with a non-configurable BKDs—e.g., have the same frequency as the reply messages of the non-configurable BKDs.

In one embodiment, the frequency selected at block 505 is one with a minimal amount of traffic from regular Wi-Fi clients.

In one embodiment, the selected frequency (or frequency hopping sequence) is one where the channel(s) are most stable.

In one embodiment, the selected frequencies have the largest number of AP receivers, thus setting the BKD to transmit away from the frequency of the carrier signal, and to a frequency that maximizes the chances of message reception.

In one embodiment, the selected frequencies is the frequency with the lowest noise.

If the AP communicates with multiple BKDs, the AP can direct the BKD to use a first sub-carrier of a channel allowing multiple concurrent BKDs to transmit on different sub-carriers in the same channel based on a BKD transmission profile learned from pervious communication patterns or statically known based on the type of BKD. For example, the AP may determine that some BKDs transmit very little data in there reply message, and thus, one sub-carrier may provide sufficient bandwidth for these BKDs. As such, the AP can assign different sub-carriers in the same channel to these BKDs, while other BKDs may have bandwidth requirements that use multiple sub-carriers or an entire channel.

Moreover, the selected frequency can be selected based on a combination of the factors described above. For example, a weighting function can be used to weight multiple factors (e.g., amount of traffic, stability, and noise) to assign a score to each channel. The channel with the best score can then be selected for assignment to the BKD. Further, the factors discussed above are just a few of exemplary factors that can be considered when selecting the frequency.

At block 510, the AP informs Wi-Fi devices of the selected frequency for the BKD. In one embodiment, when the selected BKD frequency is within the AP channel envelope (e.g. within the 80 MHz of the AP Wi-Fi channel), the AP advertises to other Wi-Fi clients (e.g., non-BKD Wi-Fi devices) that the channel (or set of frequencies) around the BKD chosen carrier frequency is punctured. Doing so informs Wi-Fi clients to not use this channel. This avoids situations where Wi-Fi clients transmit on that channel, and thus facilitates the reception of the BKD messages.

However, in other embodiments, the channel assigned to the BKD may not be punctured. In that case, the AP may not inform Wi-Fi devices of the frequency being used by the BKD. That is, block 510 may be optionally performed.

At block 515, the AP informs neighboring APs of the selected frequency for the BKD. In one example, the AP may request some of its neighboring APs (which are less loaded) to receive the reply message from the BKD by providing the select frequency to those APs. The APs can then listen for reply messages at the selected frequency on behalf of the AP. In this manner, one AP may be tasked with transmitting a message to the BKD but a different, neighboring AP may be tasked with receiving the reply message from the BKD.

In one embodiment, the AP or a wireless local-area network (LAN) controller (WLC) predicts based on past usage, or by explicit understanding of the BKD, the time at which the different BKDs transmit reply messages and reserves the medium on behalf of the BKD such as using clear-to-send (CTS)-to-self. Put differently, the AP can reserve the wireless medium for a time period on behalf of the BKD to avoid contention between the BKD transmissions and regular Wi-Fi clients.

Figure 6:
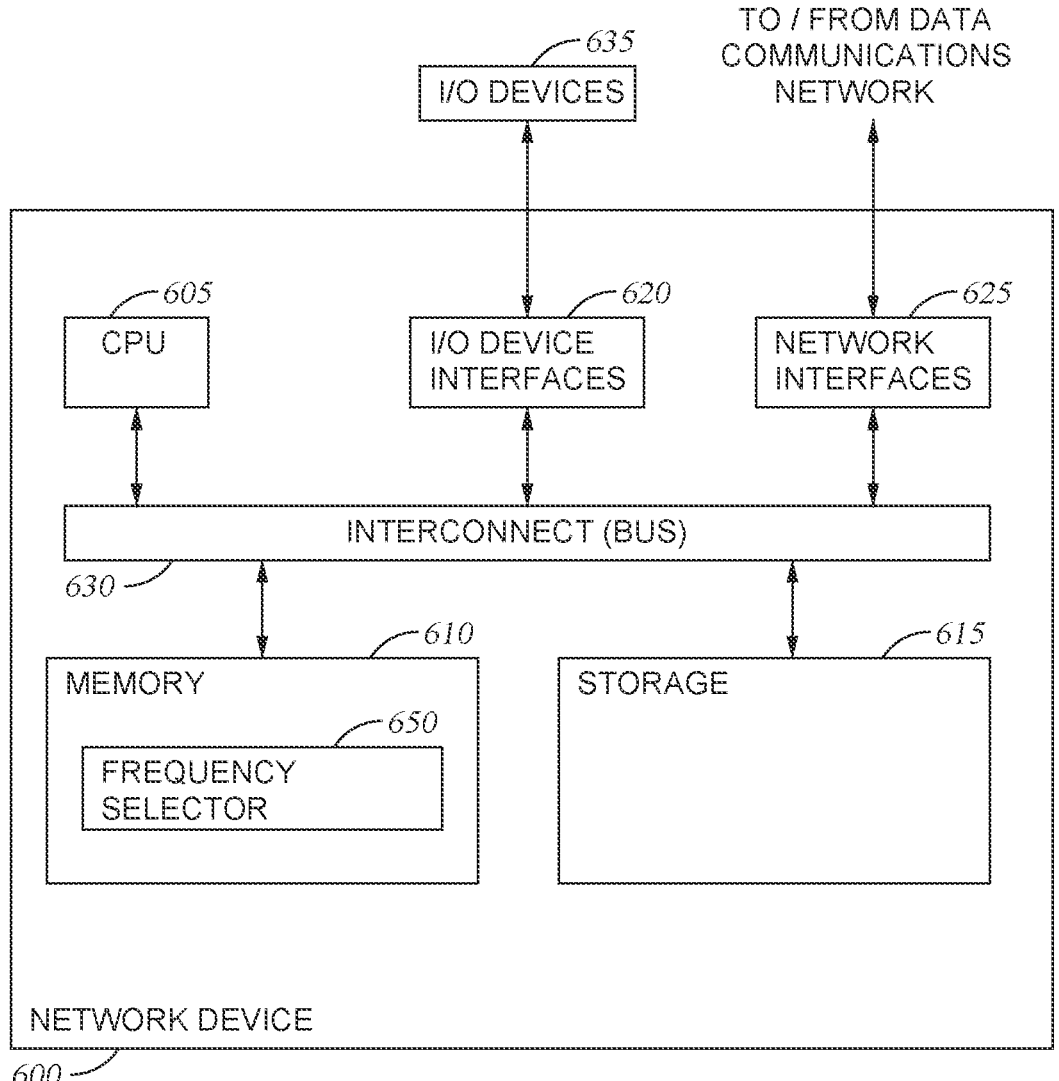
FIG. 6 depicts an example computing device configured to perform various aspects of the present disclosure, according to some embodiments of the present disclosure.

FIG. 6 depicts an example computing device (e.g., a network device 600) configured to perform various aspects of the present disclosure, according to some embodiments of the present disclosure. In some embodiments, the network device 600 corresponds to an AP 100 of FIG. 1. Although depicted as a physical device, in embodiments, the network device 600 may be implemented using virtual device(s), and/or across a number of devices (e.g., in a cloud environment).

As illustrated, the network device 600 includes a CPU 605, memory 610, storage 615, a network interface 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the network device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes a frequency selector 650, which may perform one or more embodiments discussed above (e.g., blocks 205 in FIG. 3 and blocks 505-515 in FIG. 5). The frequency selector 650 may select the frequencies used by the BKDs and coordinate with regular Wi-Fi clients and neighboring APs. Although depicted as discrete components for conceptual clarity, in embodiments, the operations of the depicted components (and others not illustrated) may be combined or distributed across any number of components. Further, although depicted as software residing in memory 610, in embodiments, the operations of the depicted components (and others not illustrated) may be implemented using hardware, software, or a combination of hardware and software.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a non-transitory computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method, comprising:
transmitting, from an access point (AP), a frame to a backscatter device (BKD) using a first frequency, wherein the frame provides power to the BKD and comprises a parameter that causes the BKD to transmit a reply message using a second frequency different from the first frequency, wherein the parameter comprises a frequency offset that adjusts a frequency filter in the BKD; and receiving, at the AP, a reply message from the BKD using the second frequency and the power provided by the AP.

2. The method of claim 1, wherein the frequency filter is configured to, using the parameter, shift a carrier frequency of the reply message compared to a carrier frequency of the frame, wherein the parameter indicates a frequency hopping sequence.

3. The method of claim 1, wherein the frame comprises a second parameter that causes a second BKD to transmit a second reply message using a third frequency different from the first and second frequencies, the method comprises:

receiving, at the AP, the second reply message from the second BKD using the third frequency and the power provided by the AP.

4. The method of claim 3, wherein the reply message from the BKD and the second reply message from the second BKD are received in parallel at the AP.

5. The method of claim 4, wherein the second and third frequencies are in different sub-carriers in a same channel.

6. The method of claim 5, wherein the second frequency is part of a first channel and the third frequency is part of a second channel different from the first channel.

7. The method of claim 1, further comprising:

transmitting, from the AP, a message to a non-BKD Wi-Fi device that a channel associated with the second frequency has been punctured so the non-BKD Wi-Fi device does not use the channel for communication.

8. The method of claim 1, further comprising:

reserving, by the AP, the second frequency for use by the BKD for a time period using clear-to-send (CTS)-to-self.

9. The method of claim 2, wherein the frequency filter comprises a semiconductor filter with a lookup table and a switching capability for tuning the frequency.

10. An AP, comprising:

a processor; and memory configured to store an application which, when executed by the processor, performs an operation, the operation comprising:

transmitting a frame to a BKD using a first frequency, wherein the frame provides power to the BKD and comprises a parameter that causes the BKD to transmit a reply message using a second frequency different from the first frequency, wherein the parameter comprises a frequency offset that adjusts a frequency filter in the BKD; and receiving a reply message from the BKD using the second frequency and the power provided by the AP.

11. The AP of claim 10, wherein the parameter indicates a frequency hopping sequence.

12. The AP of claim 10, wherein the frame comprises a second parameter that causes a second BKD to transmit a second reply message using a third frequency different from the first and second frequencies, the operation comprises:

receiving, at the AP, the second reply message from the second BKD using the third frequency and the power provided by the AP.

13. The AP of claim 12, wherein the reply message from the BKD and the second reply message from the second BKD are received in parallel at the AP.

14. The AP of claim 13, wherein the second and third frequencies are in different sub-carriers in a same channel.

15. The AP of claim 14, wherein the second frequency is part of a first channel and the third frequency is part of a second channel different from the first channel.

16. The AP of claim 10, wherein the operation further comprises:

transmitting a message to a non-BKD Wi-Fi device that a channel associated with the second frequency has been punctured so the non-BKD Wi-Fi device does not use the channel for communication.

17. The AP of claim 10, wherein the operation further comprises:

reserving the second frequency for use by the BKD for a time period using clear- to-send (CTS)-to-self.

18. A non-transitory computer readable medium containing computer program code that, when executed by operation of one or more processors, performs an operation comprising:

transmitting, from an AP, a frame to a BKD using a first frequency, wherein the frame provides power to the BKD and comprises a parameter that causes the BKD to transmit a reply message using a second frequency different from the first frequency, wherein the parameter comprises a frequency offset that adjusts a frequency filter in the BKD; and receiving, at the AP, a reply message from the BKD using the second frequency and the power provided by the AP.

19. The non-transitory computer readable medium of claim 18, wherein the parameter indicates a frequency hopping sequence.

20. The non-transitory computer readable medium of claim 18, wherein the frame comprises a second parameter that causes a second BKD to transmit a second reply message using a third frequency different from the first and second frequencies, the operation comprises:

receiving, at the AP, the second reply message from the second BKD using the third frequency and the power provided by the AP, wherein the reply message from the BKD and the second reply message from the second BKD are received in parallel at the AP.

* * * * *